United States Patent
Sewell, Sr.

(10) Patent No.: US 7,320,723 B2
(45) Date of Patent: Jan. 22, 2008

(54) EXHAUST GAS FILTER AND FILTERING SYSTEM

(75) Inventor: Robert R. Sewell, Sr., Wendell, ID (US)

(73) Assignee: Air Institution, Inc., Cochise, AZ (US)

( * ) Notice: Subject to any disclaimer, the term of this patent is extended or adjusted under 35 U.S.C. 154(b) by 402 days.

(21) Appl. No.: 10/988,566

(22) Filed: Nov. 16, 2004

(65) Prior Publication Data

US 2005/0126139 A1    Jun. 16, 2005

Related U.S. Application Data

(63) Continuation-in-part of application No. 10/716,708, filed on Nov. 20, 2003, now abandoned.

(51) Int. Cl.
*B01D 46/30* (2006.01)
*F01N 3/022* (2006.01)

(52) U.S. Cl. .......................... 55/512; 55/385.3; 55/490; 55/503; 55/515; 55/516; 55/518; 55/519; 55/523; 55/DIG. 10; 55/DIG. 30; 55/DIG. 37; 96/138; 96/139; 96/147; 96/153; 96/383; 96/386; 60/311

(58) Field of Classification Search .............. 55/385.3, 55/490, 503, 515, 516, 517, 518, 519, 523, 55/DIG. 10, DIG. 30, DIG. 37; 96/135, 96/138, 139, 147, 152, 153, 380, 383, 386, 96/387; 60/311

See application file for complete search history.

(56) References Cited

U.S. PATENT DOCUMENTS

| | | | | |
|---|---|---|---|---|
| 1,522,111 A | * | 1/1925 | Franck-Philipson | .......... 55/512 |
| 2,846,021 A | * | 8/1958 | Encinas | ...................... 55/512 |
| 3,016,108 A | * | 1/1962 | Myddelton | .................. 55/512 |
| 3,105,752 A | * | 10/1963 | Bruce | .......................... 55/512 |
| 3,406,501 A | | 10/1968 | Watkins | |
| 3,933,643 A | | 1/1976 | Colvin et al. | |
| 3,960,528 A | | 6/1976 | Jacobs et al. | |
| 4,042,352 A | * | 8/1977 | Shujiro et al. | ................ 55/512 |
| 4,063,900 A | * | 12/1977 | Mita et al. | .................... 55/518 |
| 4,149,862 A | | 4/1979 | Sewell, Sr. | |
| 4,267,056 A | | 5/1981 | McClure | |

(Continued)

FOREIGN PATENT DOCUMENTS

DE    34 00 091 A1 *  7/1985

*Primary Examiner*—Jason M. Greene
(74) *Attorney, Agent, or Firm*—Thorpe North & Western LLP (57) ABSTRACT

An exhaust gas filter cartridge which is suitable for use in a muffler such as to form an exhaust gas filtering system is disclosed. The filter cartridge preferably includes a first porous longitudinal wall and a second porous longitudinal wall, both porous longitudinal walls having openings which allow for a sufficient gas flow through the filter cartridge. An absorbent material, preferably in pellet form, is housed substantially in-between the first porous longitudinal wall and the second porous longitudinal wall of the filter cartridge. The filter cartridge is preferably disposable. A guard casing may be used in conjunction with the filter cartridge to provide an exhaust gas filtering system. The guard casing preferably has two end closure structures. A gas inlet end structure is preferably associated with one end closure structure and a gas outlet end structure may be associated with the other end closure structure of the guard casing.

17 Claims, 5 Drawing Sheets

U.S. PATENT DOCUMENTS

| | | |
|---|---|---|
| 4,318,720 A | 3/1982 | Hoggatt |
| 4,610,700 A | 9/1986 | Miller et al. |
| 4,728,503 A | 3/1988 | Horaguchi et al. |
| 4,906,263 A * | 3/1990 | von Blucher et al. .......... 96/135 |
| 5,179,062 A | 1/1993 | Dufour |
| 5,223,009 A | 6/1993 | Schuster et al. |
| 5,246,472 A | 9/1993 | Herman et al. |
| 5,290,457 A * | 3/1994 | Karbachsch et al. .......... 55/512 |
| 5,470,364 A | 11/1995 | Adiletta |
| 6,423,534 B1 | 7/2002 | Shiba et al. |
| 6,468,333 B2 * | 10/2002 | Spiegelman et al. .......... 55/516 |
| 6,797,041 B2 * | 9/2004 | Brownell et al. .............. 55/516 |
| 7,014,682 B2 * | 3/2006 | Hickerson et al. ............. 96/138 |
| 7,041,159 B2 * | 5/2006 | Entezarian et al. ............ 55/518 |
| 2002/0179522 A1* | 12/2002 | Phillips et al. ................. 96/233 |
| 2004/0055957 A1 | 3/2004 | Palm et al. |

\* cited by examiner

EXHAUST GAS FILTER AND FILTERING SYSTEM

RELATED APPLICATION

This application is a continuation-in-part of U.S. Ser. No. 10/716,708 filed Nov. 20, 2003 now abandoned entitled "EXHAUST GAS FILTER AND FILTERING SYSTEM."

FIELD OF INVENTION

The present invention relates to an exhaust gas filter and filtering system, such as a filter cartridge alone and in combination with a filtering system such as a muffler. More particularly, the present invention relates to an internal combustion engine exhaust gas filter and filtering system comprising a filter cartridge and an absorbent material operatively located inside of the filter cartridge. The absorbent material preferably absorbs liquids and gaseous fumes. A preferred absorbent material is diatomite pellets.

BACKGROUND OF THE INVENTION

Numerous attempts have been made to produce satisfactory filtering devices for removing objectionable constituents from the exhaust gases of internal combustion engines. The filters of the prior art have been subject to two common mechanical faults, namely, channeling of the gases in the filter element whereby intimate contact between the gases to be filtered and the filter element is not achieved and a deterioration of the structure of the exhaust gas filter element due to the corrosive effects of the exhaust gases at the high temperatures involved.

The prior art discloses various filtering devices. Known in the prior art is Adiletta, U.S. Pat. No. 5,470,364, which discloses a diesel exhaust filter including a microporous filter for removing particulate contaminants. The filter material can be made of fibers or powders, such as high purity silica, aluminosilicate or boronsilicate-E glass.

Also known in the prior art is von Blucher et al., U.S. Pat. No. 4,906,263, which discloses an adsorption filter for removing undesirable gases or fluids. The filter includes a fixed bed of adsorber particles which are pourable and abrasion-resistant. The adsorber particles can be beads having a diameter of 0.1-1 mm. Diatomite is disclosed as being suitable for use.

Also known is Shiba et al., U.S. Pat. No. 6,423,534 B1, which discloses a method and apparatus for decomposing and eliminating ethanol in exhaust gas. The apparatus includes a filter material including a microorganism. The filter material for carrying the microorganism can be of diatomaceous earth.

Also known is Colvin et al., U.S. Pat. No. 3,933,643, which discloses electrically conductive filter elements including a carbonaceous conductive material and optionally other fibrous material, such as silica, or a bed-type filter, such as a diatomaceous earth.

Also known is Iida et al., U.S. Pat. No. 4,728,503, which discloses a filter medium for treating an exhaust gas including a porous ceramic substrate with a pre-coat layer to prevent clogging of the porous substrate, and a layer of slaked lime or calcium carbonate and calcium chloride. The pre-coat layer can be of a powder of diatomaceous earth.

Also known is Dufour, U.S. Pat. No. 5,179,062, which discloses a method of producing filtration agents. The method involves the calcination of diatomites in a circulated bed furnace to control agglomeration of the diatomaceous particles. Also known in the prior art relating to exhaust mufflers, including with perforated tubes and a particulate trap, are Jacobs et al., U.S. Pat. No. 3,960,528; Hoggatt, U.S. Pat. No. 4,318,720; Schuster et al., U.S. Pat. No. 5,223,009; and Herman et al., U.S. Pat. No. 5,246,472.

None of these patents disclose diatomites utilized with the muffler.

The present invention achieves a remedy to the prior art deficiencies noted above, and not addressed in the prior art, by a novel filter device and filtering system, and in particular a novel filter cartridge.

SUMMARY OF THE INVENTION

The present invention relates to an exhaust gas filter and filtering system, such as a filter cartridge alone and in combination with a filtering system such as a muffler. More particularly, the present invention relates to an internal combustion engine exhaust gas filter comprising a filter cartridge, which is preferably a disposable cartridge, and an absorbent material operatively located inside of the filter cartridge. The absorbent material preferably absorbs liquids and gaseous fumes. The absorbent material is a diatomite material, preferably in pellet form.

A guard casing, e.g., muffler housing, can be present in combination with the filter cartridge to form the filtering system. The guard casing preferably has end closure structures and longitudinal internal surfaces. An exhaust gas inlet end structure is preferably associated with one end closure structure and a treated gas outlet end structure is preferably associated with the other end closure structure. The filter cartridge may be preferably designed for reception within the guard casing.

The filter cartridge has porous longitudinal surfaces and may have porous external end surfaces or non-porous external end surfaces. The filter cartridge may be any suitable shape, e.g., tubular or rectangular, and comprises a first porous longitudinal wall, a second porous longitudinal wall and a gaseous and odor absorbent diatomite material housed substantially in-between the first porous longitudinal wall and the second porous longitudinal wall.

In one embodiment, the first and second porous longitudinal walls of the filter cartridge are an internal tube and an external tube; respectively, both tubes having openings of suitable size to allow for an adequate gas flow through the tubes to provide for treatment during movement of an exhaust gas flow through the cartridge. The openings are preferably louvers or mesh openings which allow for a greater gas flow through the internal and external tubes of the filter cartridge. As such, the filter cartridge is gas permeable from end to end, radially from the longitudinal external surface thereof and radially from the longitudinal internal surface thereof. The gaseous and odor absorbent diatomite material is housed substantially in-between the concentric layers of the filter cartridge, i.e., in-between the internal tube and external tube of the filter cartridge.

The filter cartridge may also comprise a mesh tube outside and around the external tube. The mesh tube aids in controlling the exhaust gas flowing through the filter cartridge.

In another embodiment, the first porous longitudinal wall of the filter cartridge is a first rectangular wall and the second porous longitudinal wall is a second rectangular wall. The first and second rectangular walls are in substantially spaced alignment with each other, preferably parallel to each other, and are side walls of the filter cartridge which is substantially rectangular. Both rectangular side walls have openings of suitable size to allow for an adequate gas flow through the rectangular side walls to provide for treatment during movement of an exhaust gas flow through the cartridge. The openings are preferably louvers or mesh openings which allow for a greater gas flow through the rectangular side walls of the filter cartridge. The other walls, i.e., top, bottom and two end walls, of the filter cartridge of this embodiment which form the longitudinal filter cartridge which is substantially rectangular in shape may be porous or non-porous surfaces. The gaseous and odor absorbent diatomite material is housed substantially in-between the walls of the filter cartridge.

The filtering system of the present invention may comprise a spacing means such as, but not limited to, at least one bracket, at least one holder plate or at least one rail. The spacing means, i.e., bracket, holder plate or rail, may be formed of rigid sheet material, preferably refractory relative to the temperature and corrosive characteristics of the exhaust gases. The spacing means may preferably be disposed in contiguous relation to the longitudinal internal surface of the guard casing for holding the filter cartridge within the guard casing with the longitudinal external walls or the end walls of the filter cartridge being in contact with the spacing means.

BRIEF DESCRIPTION OF THE DRAWINGS

Referring now to the drawings.

DETAILED DESCRIPTION OF THE PREFERRED EMBODIMENTS

The present invention relates to a gas filter, preferably in the form of a disposable cartridge for use alone and in combination with an exhaust gas filtering system such as an internal combustion engine exhaust gas system. Referring to FIGS. 1-12, an exhaust gas filtering system 10 of the present invention comprises (1) an elongated guard casing 12 having end closure structures and longitudinal internal surfaces, (2) a filter cartridge 24,24' according to the invention, which is preferably replaceable and (3) an absorbent material operatively located inside the filter cartridge 24,24'. A gas inlet end structure 14 is preferably associated with one end closure structure and a gas outlet end structure 16 is preferably associated with the other end closure structure of the guard casing 12.

Since internal combustion engine exhaust gas filters often operate at temperatures as high as 500° F. (260° C.) and higher and include constituents which are extremely corrosive at elevated temperatures, the guard casing 12 and the filter cartridge 24,24' may be formed from a material such as, but not limited to, stainless steel, aluminum-coated steel, lead-coated steel, aluminum, metal alloy, galvanized metal alloy, a polymer-fiberglass material or any combination thereof. A filtering system 10 made from aluminum or polymer-fiberglass is lightweight, strong and heat resistant.

The filter cartridge 24,24' of the present invention is preferably elongated, replaceable and structured for reception in the guard casing 12 operatively near the gas inlet end structure 14. The filter cartridge 24,24' has porous longitudinal surfaces and may or may not have porous end surfaces. The filter cartridge 24,24' comprises a first porous longitudinal wall, a second porous longitudinal wall and a gaseous and odor absorbent diatomite material housed substantially in-between the first porous longitudinal wall and the second porous longitudinal wall.

In one embodiment, the first longitudinal wall is an internal tube 26 and the second longitudinal wall is an external tube 28. The filter cartridge 24 also has two ends. A gaseous and odor absorbent material 40 is housed substantially in-between the concentric layers of the filter cartridge 24, i.e., in-between the internal tube 26 and the external tube 28 of the filter cartridge 24. In a preferred embodiment, the absorbent material 40 is a diatomite material, which is further described hereinafter.

The internal tube 26 and the external tube 28 include openings 31 of a suitable size to allow for adequate gas flow. The openings 31 are preferably louvers or mesh openings which allow for a greater gas flow through the internal tube 26 and the external tube 28 of the filter cartridge 24. As such, the filter cartridge 24 is gas permeable along its length, radially from the longitudinal external surface thereof and radially from the longitudinal internal surface thereof. Additionally, a core air passage 34 is formed inside of the internal tube 26 through which exhaust gas moves when the filter cartridge 24 is used alone or in conjunction with a filtering system 10 such as a muffler.

The filter cartridge 24 of this embodiment is preferably a cylindrical shape. However, the filter cartridge 24 may be of any suitable shape. The internal tube 26 and the external tube 28 of the filter cartridge 24 may be formed from any suitable material. The tubes 26 and 28 are preferably formed from stainless steel, aluminum-coated steel, lead-coated steel, aluminum, polymer-fiberglass material or any combination thereof.

A polymer-fiberglass material is a preferable material from which to form the tubes 26,28 of the filter cartridge 24 since this material is lightweight, strong and heat resistant. Specifically, a polymer-fiberglass filter cartridge can withstand temperatures up to 1300° F. (705° C.). As such, the polymer-fiberglass material can easily withstand typical heat exhaust which is generally in a temperature range from about 150°-200° F. (66° C.-94° C.). However, stainless steel is also a preferable material from which to form the tubes 26,28 of the filter cartridge 24 since this material is also strong and heat resistant.

Figure 1:
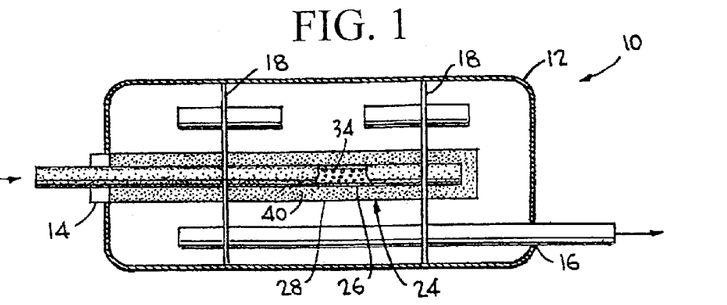
FIG. 1 shows a top cross-sectional view of a first embodiment of a gas filter of the present invention in combination with a muffler structure.
Figure 2:
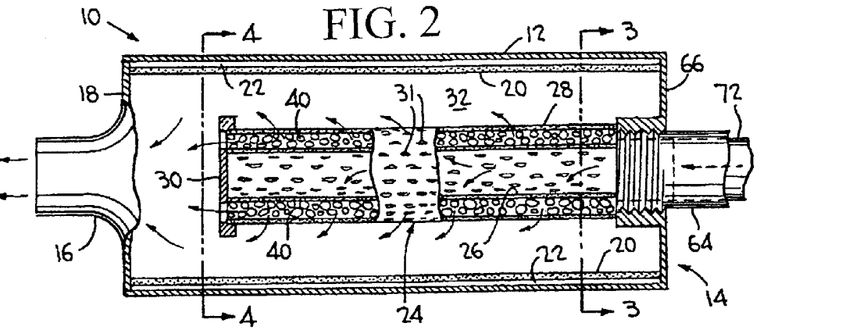
FIG. 2 shows a longitudinal cross-sectional view of the first embodiment of the gas filter of the present invention in combination with a muffler structure.
Figure 3:
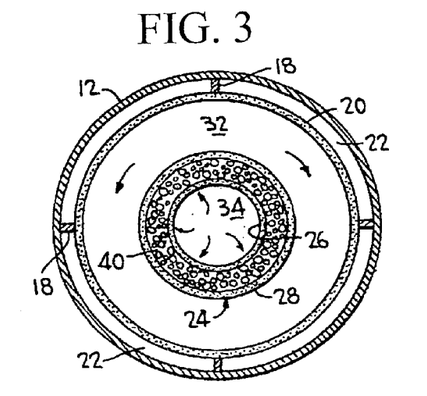
FIG. 3 shows a cross-sectional view taken along line 3-3 of FIG. 2.
Figure 4:
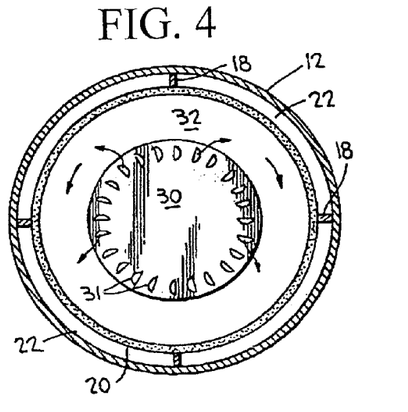
FIG. 4 shows a cross-sectional view taken along the line 4-4 of FIG. 2.

In a preferred embodiment as shown in FIG. 2, the openings 31 in internal tube 26 and external tube 28 of the filter cartridge 24 are louvers of a sufficient size to provide for desired permeation and exhaust gas flow. The louvers preferably range in size from about one-eighth of an inch (⅛ inch) (0.32 cm) to about three-eighths of an inch (⅜ inch) (0.95 cm), and most preferably from about one-quarter of an inch (¼ inch) (0.64 cm) to about five-sixteenths of an inch (5/16 inch) (0.79 cm).

Figure 6:
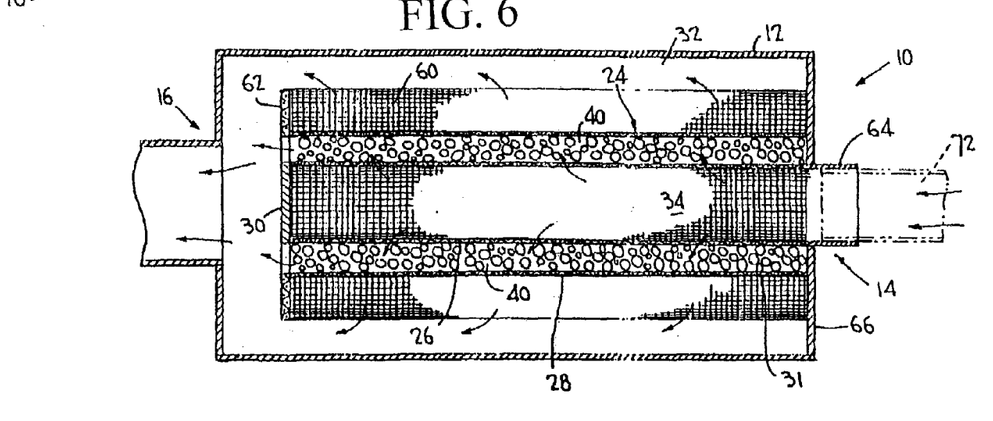
FIG. 6 shows a cross-sectional view of a third embodiment of the gas filter of the present invention in combination with a muffler structure.

In another preferred embodiment as shown in FIG. 6, internal tube 26 and external tube 28 are formed from a mesh material such that the openings 31 in internal tube 26 and external tube 28 of the filter cartridge 24 are mesh openings. The mesh openings are of a sufficient size to provide for desired permeation and exhaust gas flow. The mesh openings preferably range in size from about one-eighth of an inch (⅛ inch) (0.32) to about three-eighths of an inch (⅜ inch) (0.95 cm), and most preferably from about one-quarter of an inch (¼ inch) (0.64 cm) to about five-sixteenths of an inch (5/16 inch) (0.79 cm). The material used to form the mesh openings of internal tube 26 and external tube 28 of the filter cartridge 24 is preferably a stainless steel material ranging in thickness from about 12 gauge to about 16 gauge. However, any suitable material of any suitable thickness may be used.

The gaseous and odor absorbent material housed in-between the first porous longitudinal wall and the second porous longitudinal wall, such as the internal tube 26 and external tube 28, of the filter cartridge 24 is a diatomite material. Diatomite is a sedimentary rock primarily composed of fossilized remains of unicellular fresh water plants known as Diatoms. Diatomite is approximately 90% silicon dioxide, with the remainder of its contents being elemental minerals. Diatomite 40 of the present invention absorbs odors, fumes, liquids and undesired gases from the exhaust gas entering the filter cartridge 24 and the filtering system 10, such as from gasolines and diesel gas, so that the exiting gas is essentially free of these odors, fumes, liquids and undesired gases which can pollute the environment. The diatomite 40 of the present invention is also strong enough to destroy smog which passes through the filter cartridge 24 from an engine.

The diatomite material of the present invention is preferably in the form of pellets. The diatomite pellets 40 may be any suitable size of pellets. However, the diatomite pellets 40 preferably range in size from about one-quarter of an inch (¼ inch) (0.64 cm) to about five-eighths of an inch (⅝ inch) (1.59 cm). Specifically, diatomite pellets of the size such as MP 94 and MP 95 are preferred and are in a size range of one-half of an inch (½ inch) (1.3 cm) to five-eighths of an inch (⅝ inch) (1.59 cm). The size of the diatomite pellets 40 preferably has correspondence to the size and the power of the engine used in conjunction with the filter cartridge 24 of the present invention. For example, 4-cylinder, V6 and V8 engines are utilized with a cartridge including pellets in a size range of ¼ inch (0.64 cm) to ½ inch (1.3 cm), ¼ inch (0.64 cm) to ½ inch (1.3 cm), and ¼ inch (0.64 cm) to ⅝ inch (1.59 cm), respectively.

Diatomite pellets 40 are an advantageous absorbent material for use in a filter cartridge 24 in combination with an exhaust gas filtering system 10 of the present invention because the diatomite is lightweight and safe to use since it is not harmful to humans, animals, plants or bodies of water. Additionally, the diatomite pellets 40 have no reaction at temperatures tested over 5000° F. (2760° C.). As such, these diatomite pellets 40 are fire resistant and aid in preventing the first and second porous longitudinal walls, such as tubes 26 and 28, of the filter cartridge 24 from overheating or rusting due to the flow of the exhaust through the filter cartridge 24. Additionally, the life of the diatomite pellets 40 of the present invention is preferably from about 60,000 miles (96,561 km) to about 100,000 miles (160,934 km) depending on the maintenance and driving conditions of the engine.

In order for the diatomite pellets 40 to provide the desired absorption of undesired gases from the engine exhaust, the gas flow pressure through the filter cartridge 24 is preferably less than five pounds per square inch (5 psi) (34 kPa). In a preferred embodiment, the gas flow pressure through the filter cartridge 24 of the present invention is 1.5 psi (10 kpa), well within the preferred range. The gas flow pressure through the filter cartridge 24 is important to maintain a strong gas flow through the diatomite so that forceful contact is obtained to assist in absorption of contaminants from the gas flow by the diatomite.

Figure 5:
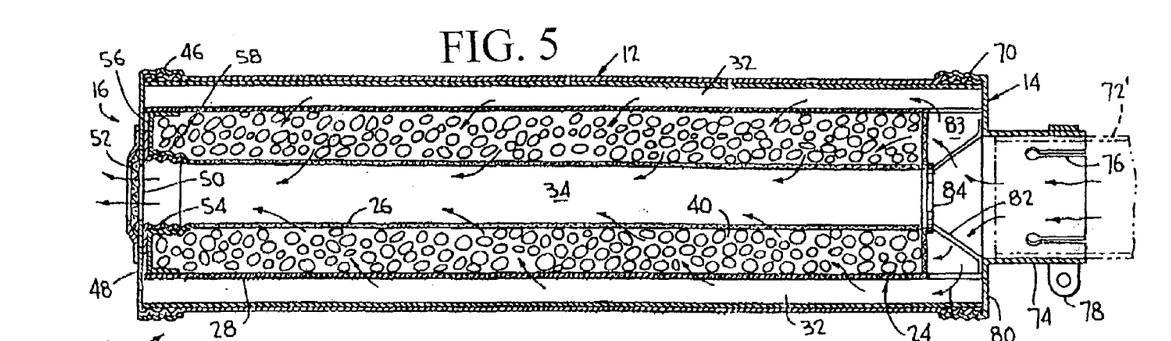
FIG. 5 shows a cross-sectional view of a second embodiment of the gas filter of the present invention in combination with a muffler structure.

In a further preferred embodiment, the filter cartridge 24 may extend the entire length of guard casing 12 from the gas inlet end structure 14 to the gas outlet end structure 16, as shown in FIG. 5. However, in another preferred embodiment, the filter cartridge 24 may extend only part of the length of the guard casing 12, such that the filter cartridge 24 extends from the gas inlet end structure 14, through the guard casing 12, but stops short of reaching the gas outlet end structure 16, as shown in FIGS. 1, 2, 6 and 8.

Where the filter cartridge 24 does not extend the entire length of the guard casing 12 to the gas outlet end structure 16, as shown in FIGS. 1, 2, 6 and 8, a stopper plate 30 may be secured to the end of the filter cartridge 24 which is opposite the gas inlet end structure 14 of the guard casing 12. The stopper plate 30 prevents exhaust gas from escaping through the end of the filter cartridge 24 without passing through the diatomite pellets 40. The stopper plate 30 is preferably made of a heavy-duty heat-proof material such as stainless steel, aluminum-coated steel, lead-coated steel, aluminum, polymer-fiberglass or any combination thereof.

The stopper plate 30 may be completely solid or may have a plurality of openings 31 near its outer circumference located adjacent the diatomite pellets 40 in-between external tube 28 and internal tube 26 of the filter cartridge 24. These openings 31 may be louvers or mesh openings such as the openings 31 in internal tube 26 and external tube 28 of the filter cartridge 24, as described above. A complete solid stopper plate 30 prevents exhaust gas from escaping through the end of the filter cartridge 24, thereby forcing the exhaust gas to pass and exit through the internal tube 26, the diatomite pellets 40 and the external tube 28 of the filter cartridge 24, respectively. A stopper plate 30 having openings 31, as described above, may allow exhaust gas to pass and exit through the external tube 28 and/or the openings in the stopper plate 30 after passing through the diatomite pellets 40.

In another embodiment of the present invention, the filter cartridge 24 may also comprise an additional mesh tube 60 operatively located outside and around external tube 28, as shown in FIG. 6. This additional mesh tube 60 provides an additional means of filtering the exhaust gas from an engine. Mesh tube 60 also slows and controls the treated exhaust gas exiting the external tube 28. Specifically, mesh tube 60 slows and controls the exiting exhaust gas so that it remains in the diatomite pellets 40 for a longer time than if the mesh tube 60 was not around the external tube 28. This allows for additional absorption of odors, fumes, liquids and undesired gases from the exhaust gas so that the exiting gas is essentially free of these odors, fumes, liquids and undesired gases which can pollute the environment. The mesh tube 60 is preferably made from the same mesh material as described above in the embodiment where the tubes 26,28 may be made from a mesh material.

The additional mesh tube 60 may also have a mesh end cap 62 which aids in and serves the function of the mesh tube 60. The mesh end cap 62 is preferably in a substantially planar arrangement with the stopper plate 30 or adjacent to the stopper plate 30. However, any suitable arrangement may be used.

In a preferred embodiment, the additional mesh tube 60 is used in conjunction with internal tube 26 and external tube 28 also being a mesh material, as described above. However, the additional mesh tube 60 may be used in conjunction with internal tube 26 and external tube 28 being louvered, as described above, or any other suitable embodiment.

The filter cartridge 24, as detailed above, may be operatively positioned inside of the guard casing 12 such that a gas passage 32 is formed in-between an internal surface of the guard casing 12 and the external surface of external tube 28 of the filter cartridge 24.

The internal surface of the guard casing 12 may be an alloy layer 20. However, an alloy layer 20 may be a separate layer operatively positioned inside of the guard casing 12. The alloy layer 20 may be a metal or aluminum alloy material or any other suitable material. The alloy layer 20 is preferably provided in a thickness in a range of 16 gauge to 18 gauge. Where the alloy layer 20 is a separate layer, gas flow passages 22 may preferably be formed in-between the internal surface of the guard casing 12 and the alloy layer 20, as shown in FIG. 2. These gas flow passages 22 provide an additional means for treated exhaust gas to exit the filtering system 10.

The internal surface of the guard casing 12 of the filtering system 10 may also have a protective coating. The protective coating may be a spray or a mat capable of withstanding the high temperatures associated with internal combustion engine exhaust emission. A preferred mat is the Interam® Brand Mat Mount manufactured by 3M, St. Paul, Minn. (U.S. Pat. No. 3,916,057). The Interam® Brand Mat Mount combines the high temperature capabilities of ceramic fibers with the high thermal expansion characteristics of vermiculite. The mat can withstand high temperatures, seal against exhaust gas bypass, reduce the skin, i.e., external, temperature of the filtering system, and resist thermal shock and vibration.

In an embodiment having an alloy layer 20, the gas passage 32 is formed between the alloy layer 20 and the external surface of the external tube 28. However, in an embodiment having an additional mesh tube 60, the gas passage 32 is formed between the alloy layer 20 or guard casing 12 and the external surface of the additional mesh tube 60.

The filter cartridge 24, as detailed above, may be secured to the gas inlet end structure 14 of the guard casing 12 by any suitable means such as, but not limited to, screw threaded flanges, welding or glue.

Within the filtering system 10, at least one spacing member, i.e., bracket 18, holder plate 18' or rail 18", may preferably be coextensive with an internal surface of the guard casing 12 and an external surface of the filter cartridge 24,24'. The spacing member, i.e., bracket 18, holder plate 18' or rail 18", preferably holds the filter cartridge 24,24' in place inside the guard casing 12 of the filtering system 10 of the present invention. The at least one spacing member is preferably a bracket 18, a holder plate 18' or a rail 18", but it can be any suitable spacing member. The at least one spacing member can be formed from stainless steel, aluminum-coated steel, lead-coated steel, aluminum, galvanized metal or alloy, polymer-fiberglass, or any combination thereof. However, any suitable material may be used to form the at least one spacing member, i.e., bracket 18, holder plate 18' or rail 18".

The guard casing 12, gas inlet end structure 14 and gas outlet end structure 16 may be any suitable structure and formed from any suitable material. However, in a preferred embodiment of the present invention, the guard casing 12, the gas inlet end structure 14 and the gas outlet end structure 16 are preferably formed from stainless steel, aluminum-coated steel, lead-coated steel, aluminum, polymer-fiberglass material or any combination thereof. The polymer-fiberglass material is preferred to form the guard casing 12 and/or end structures 14 and 16 of the filtering system 10 since this material is lightweight, strong and heat resistant. Specifically, the polymer-fiberglass material can withstand temperatures up to 1300° F. (705° C.) and as such, can withstand typical heat exhaust which is usually in the temperature range of from about 150°-200° F. (65° C.-94° C.).

Figures 7, 8:
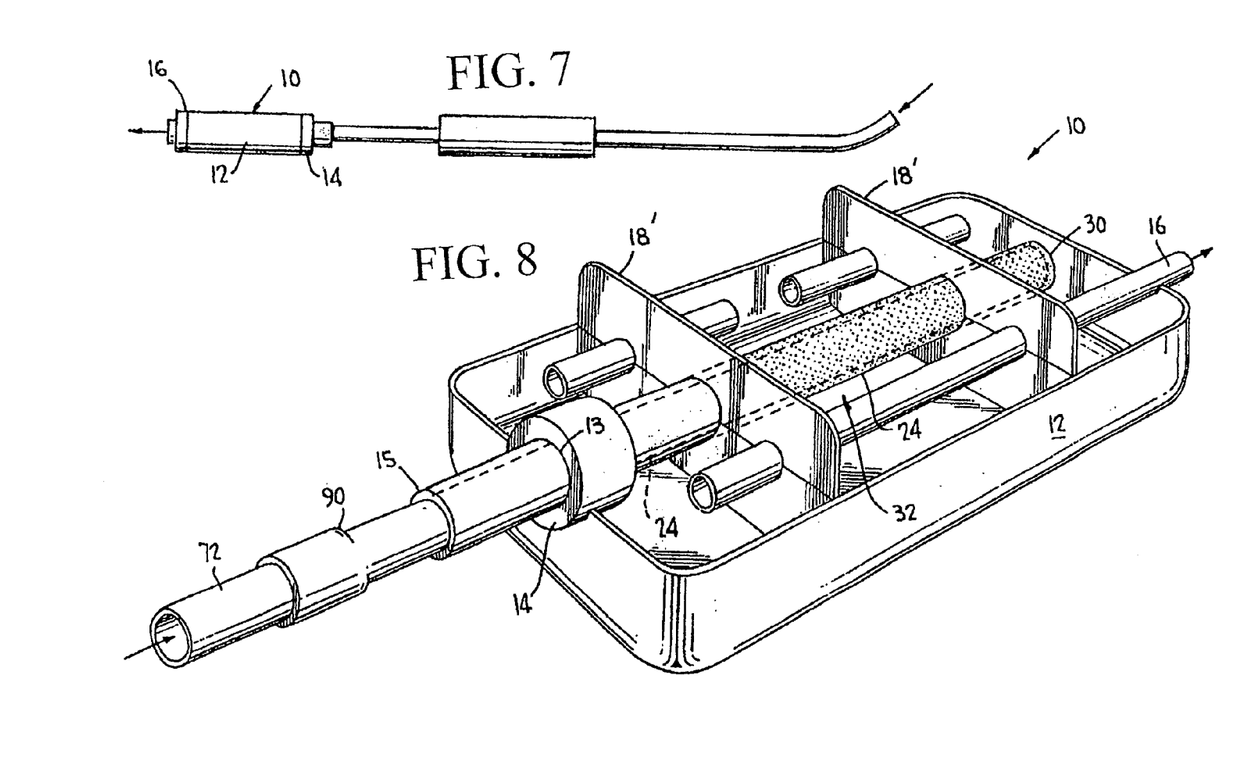
FIG. 7 shows a schematic view of the filter of the present invention in an environment of use, e.g., attached to a tailpipe of an exhaust gas system.
FIG. 8 shows a perspective view of a fourth embodiment of the gas filter of the present invention in combination with a muffler structure.

The gas inlet end structure 14 may be any suitable structure. One embodiment of a gas inlet end structure 14 is shown in FIGS. 2, 6 and 8. In this embodiment, the gas inlet end structure 14 preferably has a male mating end 64 which may or may not be threaded. The male mating end 64 is adapted for fitting the end of an exhaust tailpipe. The male mating end 64 may be secured to the exhaust tailpipe 72 of an internal combustion engine by any suitable means including, but not limited to, by a threaded reception, glue or welding. For example, FIG. 8 illustrates various securing means in conjunction with each other. Specifically, the gas inlet end structure 14 has a threaded connection 13, which is then secured to an optional pipe 90 by a glue connection 15, which is then secured to a tailpipe 72 by a suitable securing means.

This type of gas inlet structure 14 allows the exhaust gas to flow from the engine into the filtering system 10 through the gas inlet end structure 14 and into the core air passage 34. The exhaust gas is prevented from directly entering any other part of the filtering system 10 before entering the core gas passage 34 by an annular closure 66. Additionally, the annular closure 66 closes to the atmosphere the gas entry end, including the end of the gas passage 32, of the filtering system 10. The exhaust gas entering the gas inlet end structure 14 flows along a path from the core gas passage 34 outwardly through the internal tube 26, through the diatomite pellets 40 and then through the external tube 28 of the filter cartridge 24, as shown by the arrows in FIGS. 2 and 6. The diatomite pellets 40 absorb the undesired gases and fumes from the exhaust gas such that the exhaust gas is free from these gases and fumes when it exits the external tube 28 into the gas passage 32 inside of the guard casing 12. The gas then flows into the environment through the gas outlet end structure 16.

In an embodiment having an additional mesh tube 60, the exhaust gas exiting the external tube 28 must also pass through the mesh tube 60 before entering the gas passage 32. Specifically, the exhaust gas flows along a path from the engine into the core gas passage 34 outwardly through the internal tube 26, through the diatomite pellets 40, through the external tube 28 and then through the mesh tube 60 into gas passage 32, as shown by the arrows in FIG. 6.

In the embodiment shown in FIG. 5, the gas inlet structure 14 can be in the form of a cap having screw threaded flanges 70 mating with screw threads formed in the end of the guard casing 12. This embodiment of a gas inlet end structure 14 preferably includes a means for connecting the filtering system 10 to a tailpipe 72', shown in dashed lines, of an internal combustion engine by means of a conventional, reduced diameter neck 74 and the usual circumferential slots 76 and coacting tightening band 78. This embodiment of a gas inlet end structure 14 may also include an annular closure diaphragm 80 which closes to the atmosphere the gas entry end of the filtering device 10 and closes the ends of gas passage 32. An opening in this diaphragm 80 coincides with the reduced neck 74 to allow entry of the engine exhaust gases to be treated.

A spacing element 82 carried by the gas inlet end structure 14 acts as a stop for the filter cartridge 24 in spaced relation to the gas inlet end structure 14, thereby forming a gas distributing plenum 83 which, as shown by the arrows in FIG. 5, distributes the entry exhaust gas over the end of the filter cartridge 24 and into the entry ends of gas passage 32 which may be observed open into the plenum 83. The exhaust gas then flows along a path from the gas passage 32 inwardly through the external tube 28, through the diatomite pellets 40 and then through the internal tube 26 of the filter cartridge 24 into the core gas passage 34, as shown by the arrows in FIG. 5. The diatomite pellets 40 absorb the undesired gases, fumes and the like from the exhaust gas such that the exhaust gas is free from these undesired gases, fumes and the like when the gas exits the internal tube 26 into the core gas passage 34 of the filter cartridge 24. The gas then flows into the environment through the gas outlet end structure 16.

A disc 84 may optionally be operatively located in the embodiment of the gas inlet end structure 14 shown in FIG. 5 such that it acts to prevent the entering exhaust gases from flowing straight through the core gas passage 34 of the filter cartridge 24 of the filtering system 10 without passing through the diatomite pellets 40.

The gas outlet end structure 16 may be any suitable structure. A preferred embodiment of a gas outlet end structure 16 is shown in FIGS. 2, 6 and 8. This gas outlet end structure 16 may be an opening in the exiting end of the guard casing 12. This gas outlet end structure 16 may also be an elongated outwardly projecting neck or channel structure opening at the exiting end of the guard casing 12. As shown in FIGS. 2, 6 and 8, this type of gas outlet end structure 16 allows the filtered exhaust gas to flow from the gas passage 32 into the environment. This type of gas outlet end structure 16 is preferably used in conjunction with a filter cartridge 24 that does not extend the entire length of the guard casing 12 and with a filter cartridge 24 which has a stopper plate 30, as described above.

As shown in FIG. 5, another preferred embodiment of the gas outlet end structure 16 can also be in the form of a cap with threaded flanges 46 coacting with threads in the exiting end of the guard casing 12. An annular diaphragm 48 closes this end of the guard casing 12 to the atmosphere with an opening 50 for discharging the exhaust gas which has been treated. In this preferred embodiment, the opening 50 may preferably include a screen 52 for preventing the loss of pulverulent material from the filter cartridge 24 of the filtering system 10. A threaded neck 54 may extend inwardly from the gas outlet end structure 16 and may have a flange which is secured to the diaphragm 48. This gas outlet end structure 16 of the filter cartridge 24 may also be closed by a diaphragm 56 carrying an inwardly projecting neck 58 in which are formed female screw threads which mate with those on neck 54.

As shown in FIG. 5, this type of gas outlet end structure 16 allows the filtered exhaust gas to flow from the core gas passage 34 into the environment. This type of gas outlet end structure 16 is preferably used in conjunction with a filter cartridge 24 that extends the entire length of guard casing 12. Additionally, it will be seen that when the efficiency of the filtering action of the filter cartridge 24 is reduced due to clogging and/or poisoning of the carbon, by unscrewing this gas outlet end structure 16, the used filter cartridge 24 can be withdrawn and a fresh filter cartridge 24 inserted into the filtering system 10.

As shown in FIG. 5, the gas inlet end structure 14 between disc 84 and the external surface of the filtering device may be closed by a porous annular sheet of fiberglass paper which permits free flow of gases into the end of the filter cartridge 24 but restrains the pulverulent adsorbent material from escaping. If desired, a layer of perforated foil (not shown) can form the outer cylindrical surface of the filter cartridge 24, where a skin of this nature might be advisable to protect the filter cartridge 24 during shipping and handling and prior to insertion into the filtering system 10.

As shown in FIGS. 9-12, in another preferred embodiment, the filter cartridge 24' of the present invention has an elongated shape which is preferably substantially rectangular and the first porous longitudinal wall of the filter cartridge 24' is a first rectangular wall 26' and the second porous longitudinal wall of the filter cartridge 24' is a second rectangular wall 28'. These walls 26' and 28' are in substantial spaced alignment with each other (preferably parallel to each other) and are the longitudinal side walls of the filter cartridge 24'. The rectangular side walls 26' and 28' include openings 31 of a suitable size to allow for adequate gas flow. The openings 31 are preferably louvers or mesh openings which allow for a greater gas flow through the walls 26',28' to provide for treatment during movement of an exhaust gas flow through the cartridge 24'.

The other walls, i.e., top wall 100, bottom wall 102 and two end walls 104,106 of the filter cartridge 24' of this embodiment may be porous or non-porous. The diatomite material 40 is housed substantially in-between the walls 26',28',100,102,104, 106 of the filter cartridge 24'.

The walls 26',28',100,102,104,106 of this embodiment may be formed from any suitable material such as, but not limited to, stainless steel, aluminum-coated steel, lead-coated steel, aluminum, metal alloy, galvanized metal alloy, polymer-fiberglass material or any combination thereof.

Figures 9, 10:
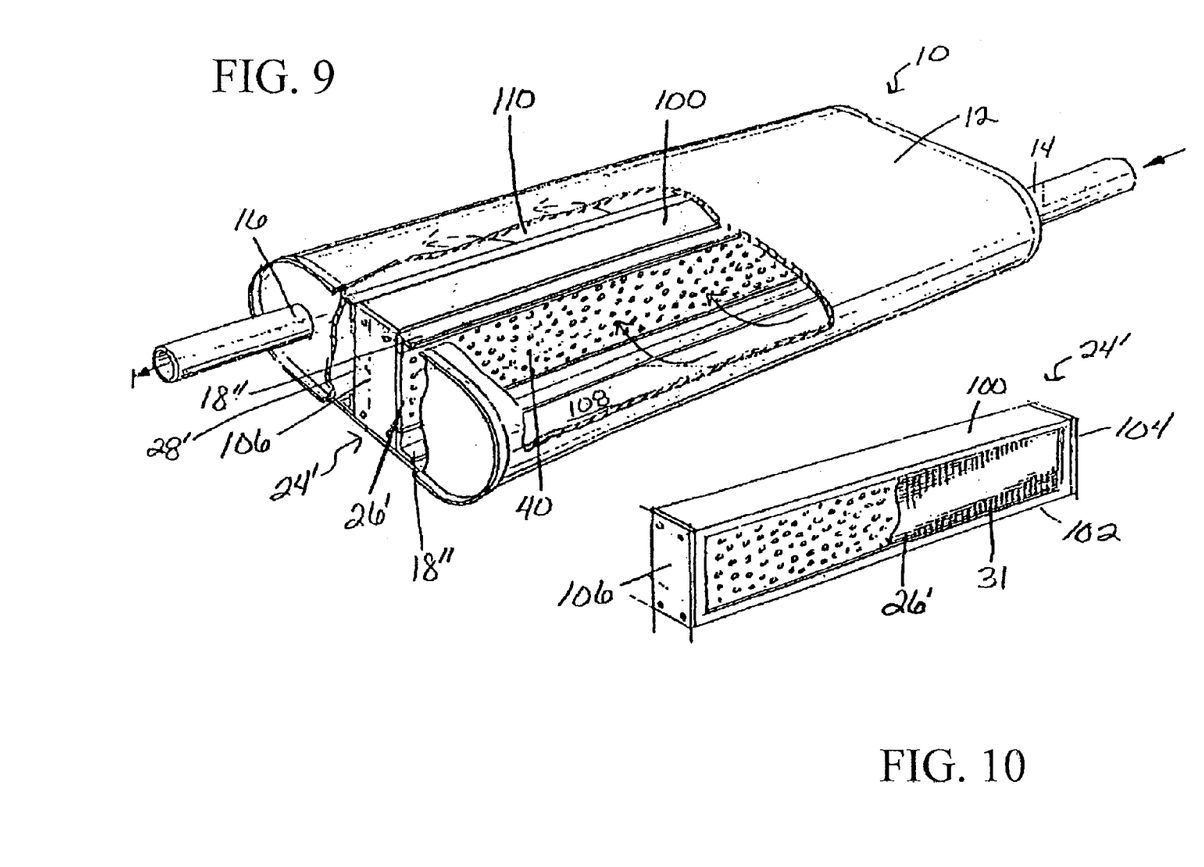
FIG. 9 shows a perspective view with a partial cut-out of a fifth embodiment of the gas filter of the present invention in combination with a muffler structure.
FIG. 10 shows a perspective view of the fifth embodiment of the gas filter of FIG. 9.

In a preferred embodiment shown in FIGS. 9 and 10, the openings 31 in the first rectangular side wall 26' and the second rectangular side wall 28' of the filter cartridge 24' are louvers of a sufficient size for desired permeation and exhaust gas flow. The louvers preferably range in size from about one-eighth of an inch (⅛ inch) (0.32 cm) to about three-eighths of an inch (⅜ inch) (0.95 cm), and most preferably from about one-quarter of an inch (¼ inch) (0.64 cm) to about five-sixteenths of an inch (5/16 inch) (0.79 cm). The first rectangular side wall 26' and the second rectangular side wall 28' may be formed from a mesh material such that the openings 31 therein are mesh openings. The mesh openings are of a sufficient size to provide for desired permeation and exhaust gas flow. The mesh openings preferably range in size from about one-eighth of an inch (⅛ inch) (0.32 cm) to about three-eighths of an inch (⅜ inch) (0.95 cm), and most preferably from about one-quarter of an inch (¼ inch) (0.64 cm) to about five-sixteenths of an inch (⁵⁄₁₆ inch) (0.79 cm). The material used to form the mesh openings of the rectangular side walls 26',28' of the filter cartridge is preferably a stainless steel material ranging in thickness from about 12 gauge to about 20 gauge. However, any suitable material of any suitable thickness may be used.

The gaseous and odor absorbent material 40 housed in-between the first rectangular side wall 26' and the second rectangular side wall 28' of the filter cartridge of this embodiment is a diatomite material, as described above.

Figures 11, 12:
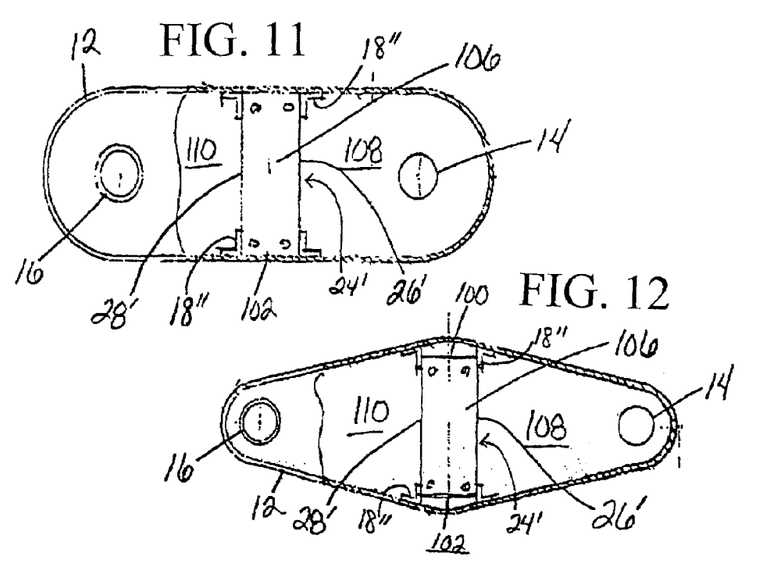
FIG. 11 shows a partial cut-out end view of FIG. 9.
FIG. 12 shows a partial cut-out end view of a sixth embodiment of the gas filter of the present invention in combination with a muffler structure.

The filter cartridge 24' of this embodiment may be secured inside of the guard casing 12 by at least one spacing member such as a rail 18". The at least one rail 18" is preferably an L-shaped rail wherein a first section of the rail 18" is secured to the filter cartridge 24' and a second section of the rail 18" is secured to the internal surface of the guard casing 12. Preferably, the first section of a first rail 18" is secured to a top edge of the first rectangular side wall 26', a first section of a second rail 18" is secured to a bottom edge of the first rectangular side wall 26', a first section of a third rail 18" is secured to a top edge of the second rectangular side wall 28' and a first section of a fourth rail 18" is secured to a bottom edge of the second rectangular side wall 28'. The second section of each of the first, second, third and fourth rails 18" are secured to the internal surface of the guard casing 12, such as shown in FIGS. 11 and 12. However, any suitable spacing member may be used to secure the filter cartridge 24' inside of the guard casing 12.

As shown in FIG. 9, the filter cartridge 24' of this embodiment may be secured inside the guard casing 12 such that the filter cartridge 24' is positioned along the entire length of the guard casing 12 in a substantially central region. This filter cartridge arrangement is preferably used with a guard casing 12 having the gas inlet end structure 14 and the gas outlet end structure 16 on opposite ends and opposite sides of the guard casing 12.

Accordingly, exhaust gas flows from an engine into the filtering system 10 through the gas inlet end structure 14 and into air passage 108. The exhaust gas flows from air passage 108 through the first rectangular side wall 26', through the diatomite pellets 40 and then through the second rectangular side wall 28' of the filter cartridge 24', as shown by the arrows in FIG. 9. The diatomite pellets 40 absorb the undesired gases and fumes from the exhaust gas such that the exhaust gas is free or substantially free from these gases and fumes when it exits the second rectangular side wall 28' into air passage 110 inside the guard casing 12. The gas then flows into the environment through the gas outlet end structure 16.

While preferred embodiments are described above, any suitable guard casing 12, gas inlet end structure 14 and gas outlet end structure 16 may be used in conjunction with the filter cartridge 24,24' of the present invention.

The novel form of the filter cartridge 24,24' which coacts with the filtering system 10 of the present invention is one in which the adsorbent diatomite pellets 40 are arranged in such a way inside the first and second porous longitudinal walls, such as tubes 26 and 28 and rectangular side walls 26' and 28', of the filter cartridge 24,24' that the filter cartridge 24,24' is gas permeable longitudinally from the gas entry end, or from the plenum 83 if used in an embodiment, radially through the concentric tubes, or through the rectangular walls.

FIG. 7 shows an exemplary positioning of the filtering system 10 of the present invention to a tailpipe downstream of a conventional internal combustion engine (not shown). Any suitable securing means may be used to secure the filtering system 10 to a tailpipe, including but not limited to threaded connection, glue or welding.

The filter cartridge 24,24' can be made and sold separately for inclusion in filter systems, e.g., mufflers structured to receive the filter cartridge 24,24'. When the life of the filter cartridge 24,24' is spent, the filter cartridge 24,24' is removed and can be reconditioned for reuse or disposed of and replaced with a new filter cartridge 24,24'.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An exhaust gas filtering system comprising:
    a guard casing;
    a filter cartridge operatively secured inside said guard casing, such that said guard casing houses said filter cartridge;
    a diatomite material operatively present in said filter cartridge;
    a first longitudinal wall having a plurality of gas-permeable openings,
    a second longitudinal wall having a plurality of gas-permeable openings, wherein said first longitudinal wall is operatively positioned in substantial spaced alignment with said second longitudinal wall;
    the diatomite material operatively present between said first longitudinal wall and said second longitudinal wall; and
    a mesh tube operatively positioned outside and around said first longitudinal wall and said second longitudinal wall, said mesh tube having a plurality of mesh openings.

2. The filter cartridge according to claim 1, wherein said diatomite material is in pellet form.

3. The filter cartridge according to claim 1, wherein said plurality of gas-permeable openings in each of said first longitudinal wall and said second longitudinal wall are louvers.

4. The filter cartridge according to claim 1, wherein said plurality of gas-permeable openings in each of said first longitudinal wall and said second longitudinal wall are mesh openings.

5. The filter cartridge according to claim 1, wherein said pellets are of a size ranging from about ¼ inch (0.64 cm) to about ⅝ inch (1.59 cm).

6. The filter cartridge according to claim 1, wherein said plurality of gas-permeable openings in each of said first longitudinal wall and said second longitudinal wall range in size from about ⅛ inch (0.32 cm) to about ⅜ inch (0.95 cm).

7. The filter cartridge according to claim 3, wherein said louvers range in size from about ⅛ inch (0.32 cm) to about ⅜ inch (0.95 cm).

8. The filter cartridge according to claim 4, wherein said mesh openings range in size from about ⅛ inch (0.32 cm) to about ⅜ inch (0.95 cm).

9. The filter cartridge according to claim 1, wherein said first longitudinal wall and said second longitudinal wall are made from stainless steel, aluminum-coated steel, lead-coated steel, aluminum, metal alloy, galvanized metal alloy, polymer-fiberglass, or a combination thereof.

10. The filter cartridge according to claim 1, further comprising a combined second end to said first longitudinal wall and said second longitudinal wall, and a stopper operatively secured to said second end.

11. The exhaust gas filtering system according to claim 1, wherein said mesh tube is made from stainless steel, aluminum-coated steel, lead-coated steel, aluminum, metal alloy, galvanized metal alloy, polymer-fiberglass or a combination thereof, and wherein said mesh tube ranges in thickness from about 12 gauge to about 16 gauge.

12. The exhaust filtering system according to claims 1, wherein said guard casing is elongated and has a gas inlet end structure and a gas outlet end structure, and said filter cartridge is operatively connected to said gas inlet end structure.

13. The exhaust gas filtering system according to claim 12, wherein said guard casing is made from stainless steel, aluminum-coated steel, lead-coated steel, aluminum, polymer-fiberglass or a combination thereof.

14. The exhaust gas filtering system according to claim 12, wherein said gas inlet end structure is operatively connected to an exhaust pipe which in turn is connected to an internal combustion engine.

15. The exhaust gas filtering system according to claim 1, wherein said guard casing is elongated and has a gas inlet end structure and a gas outlet end structure, wherein said filter cartridge is operatively connected to or near said gas inlet end structure, wherein said gas inlet end structure is operatively connected to an exhaust pipe which in turn is connected to an internal combustion engine, and wherein a flow of exhaust gas from said engine enters through said gas inlet end structure and through said openings in said first longitudinal wall, through said diatomite material and through said openings in said second longitudinal wall and exits through said gas outlet and structure.

16. The filter cartridge according to claim 1, wherein said filter cartridge has a substantially rectangular shape.

17. The filter cartridge according to claim 1, wherein said filter cartridge has a substantially tubular shape.

* * * * *